United States Patent [19]

Rich et al.

[11] Patent Number: 5,359,386
[45] Date of Patent: Oct. 25, 1994

[54] PANORAMIC ENLARGING PRINTER WITH NEGATIVE SHUTTLE

[75] Inventors: Philip R. Rich, Omaha, Nebr.; Paul L. Jaswal, Richland, Wash.; Thomas L. Bono, Bethlehem; Scott Lindenmuth, Allentown, both of Pa.

[73] Assignee: Amazing Pictures Corporation, Omaha, Nebr.

[21] Appl. No.: 40,875

[22] Filed: Mar. 31, 1993

[51] Int. Cl.$^5$ .................. G03B 27/53; G03B 27/58; G03B 37/00
[52] U.S. Cl. ........................ 355/32; 355/38; 355/50; 355/76; 354/94
[58] Field of Search ............ 355/32, 35, 38, 50, 355/52, 54, 76; 354/94

[56] References Cited

U.S. PATENT DOCUMENTS

| | | | |
|---|---|---|---|
| 1,138,963 | 5/1915 | Leash et al. | |
| 1,371,400 | 3/1921 | Shapiro. | |
| 1,372,936 | 3/1921 | Clark. | |
| 3,364,814 | 1/1968 | Iuliu | 88/24 |
| 3,369,449 | 2/1968 | Klauss et al. | 88/24 |
| 4,082,443 | 4/1978 | Draugelis et al. | 355/4 |
| 4,238,155 | 12/1980 | Fujitani | 355/50 |
| 4,717,939 | 1/1988 | Yanagawa | 355/50 |
| 4,931,832 | 6/1990 | Takenaka | 355/77 |
| 4,959,683 | 9/1990 | Otake et al. | 355/28 |
| 5,053,807 | 10/1991 | Uryu | 355/38 |
| 5,075,718 | 12/1991 | Suzuki et al. | 355/50 |

*Primary Examiner*—Michael L. Gellner
*Assistant Examiner*—Daniel Patrick Malley
*Attorney, Agent, or Firm*—John A. Beehner

[57] ABSTRACT

An apparatus for enlarging and printing panoramic photographs includes a light source and a negative shuttle having upper and lower parallel plates for securing and enclosing entirely a negative placed therebetween. Interposed between the light source and the negative shuttle is a focusing device for concentrating light emanating from the light source. The three above-described elements are operative to project an image from a negative secured in the negative shuttle in a direction opposite the light source. A lens is supported in an adjustable lens support for magnifying and focusing the image projected from the negative shuttle. Photosensitive material is supported on a supply spool, the photosensitive material being passed to a take-up spool adapted to receive the photosensitive material. A photosensitive material is supported in substantially parallel relation to the negative shuttle and is exposed to the image projected through the lens. The take-up spool, the support spool and the negative shuttle are each provided with a driving device. The negative shuttle driving device is operative to run the negative shuttle in a first direction, while the driving device for the take-up spool and support spool is operative to run the spools in a second direction opposite the first direction such that photosensitive material is run in the second direction, whereby the image projected through the lens may be transposed onto a part of the photosensitive material.

23 Claims, 6 Drawing Sheets

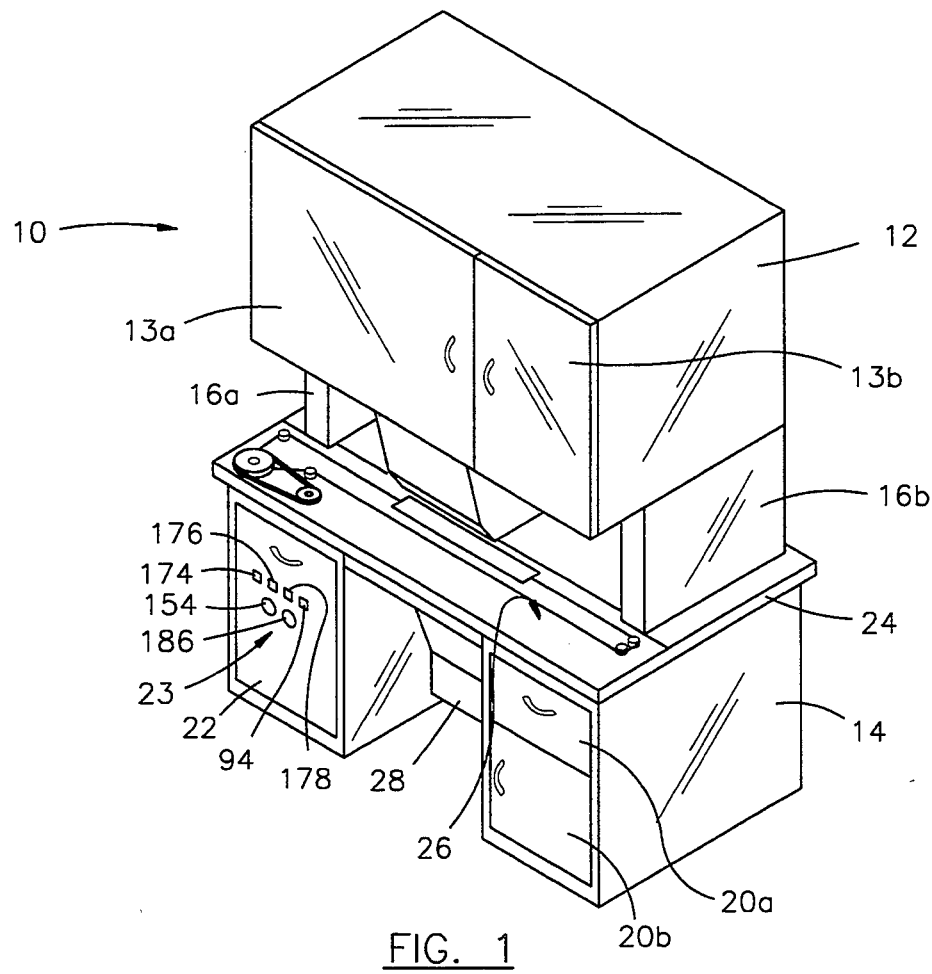
FIG. 1
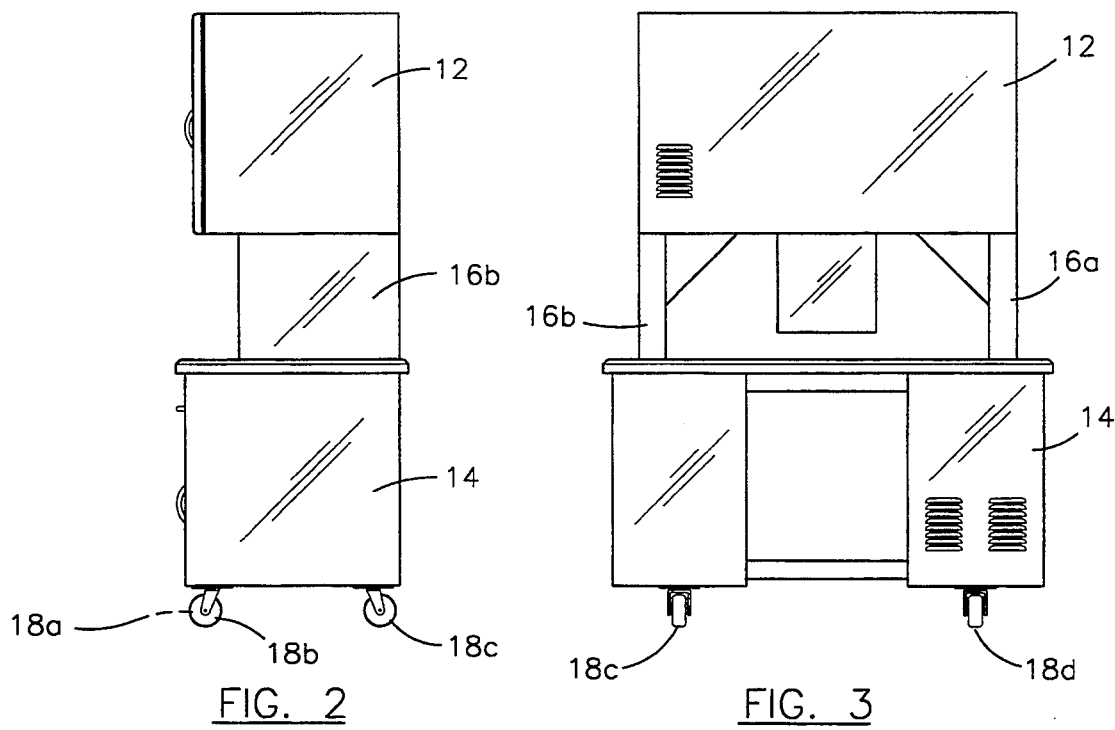
FIG. 2
FIG. 3

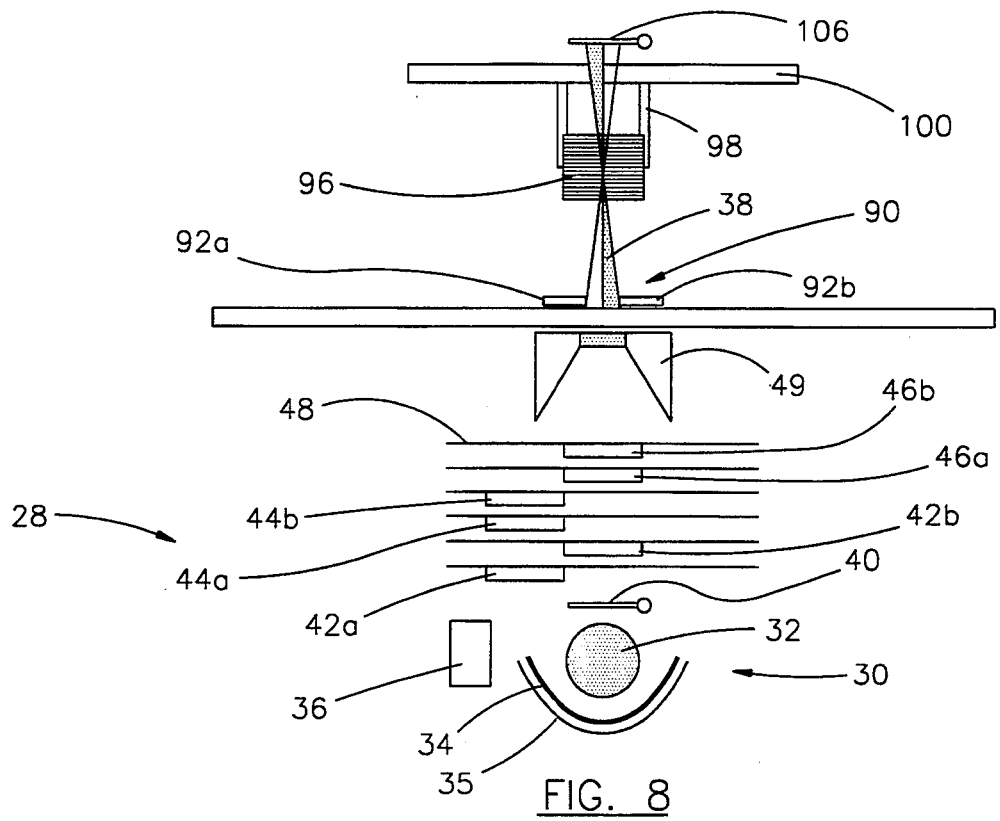
FIG. 7
FIG. 8
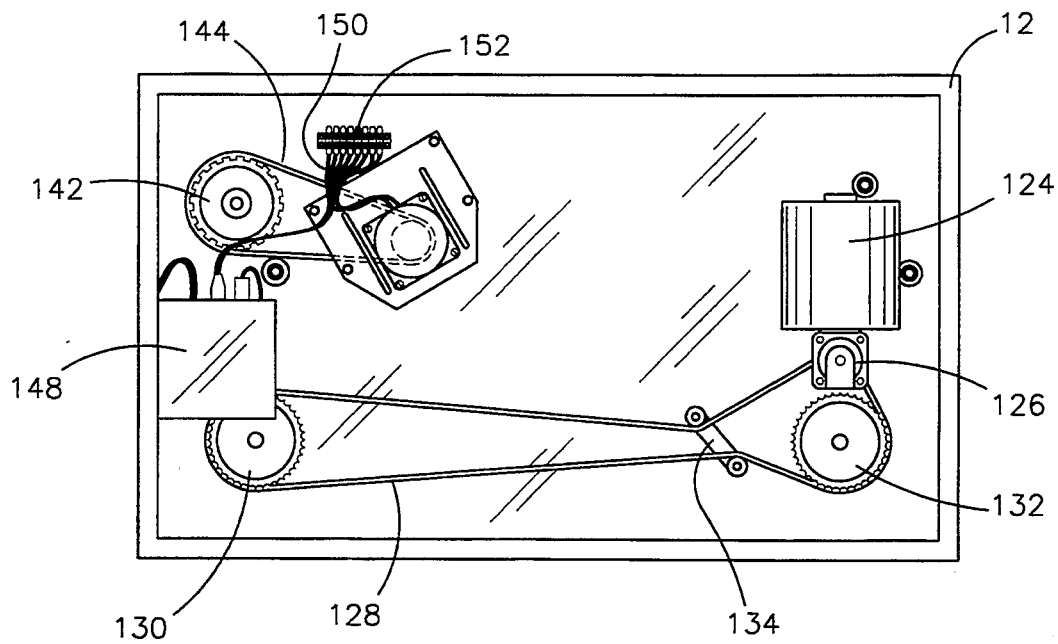
FIG. 9

PANORAMIC ENLARGING PRINTER WITH NEGATIVE SHUTTLE

BACKGROUND OF THE INVENTION

1. Technical Field

This invention relates to enlarging printers and, more particularly, to a panoramic enlarging printer which will accommodate panoramic negatives on a negative shuttle, project light through the negative into a lens, the lens then projecting the image to a photosensitive paper which will produce an enlarged photographic print having high quality and resolution.

2. Description of the Prior Art

The development of a panoramic printer is prompted by the need to produce photograph prints of large dimension (10"×90") from a smaller negative (approximately 2"×18"). Conventional enlarging systems would suggest that the negatives be fixed in a holder while being fully illuminated. To evenly illuminate a negative of panoramic size is extremely difficult. Furthermore, even if illumination can be achieved, a large area is needed to project the image from the negative onto photographic paper to receive the image. The paper to be exposed would have to be fixed to a surface that closely approximates the lens perimeters to maintain a good focus, i.e., in most cases the surface would not be flat, but would be a complex curve. In most prior art devices, the lens is placed at a position between the object and image plane. The total distance from the object to the image is a direct function of the lens focal length and the magnification factor. To obtain a good focus all along the distance of the print, a long focal length lens should be used. Because of this, the resulting overall size of the system is very large. It also takes a long time to complete an exposure and is very labor intensive.

Various attempts at improving this method are found in the prior art. For example, Leash et al., U.S. Pat. No. 1,138,963, discloses a means for printing an enlargement from a negative film which projects an image from a negative roll through a lens onto a roll of photograph paper moved in the opposite direction. Of course, the main problem with this device is that the negative is mounted on rollers, and thus when the end of the negative film is reached, the feed roller releases the negative and tension on the negative is removed. This results in the last section of the image being projected at a different angle and at a different speed than the rest of the image, thus producing an image which has poor quality at the ends of the image.

Likewise, Fujitani, U.S. Pat. No. 4,238,155, discloses a similar method and apparatus to enlarge photographs, also using a negative mount on rollers. The same problems occur with this apparatus, however, as encountered in the Leash apparatus. Furthermore, on both the Leash and Fujitani devices, to run the negative through the device more than once requires rewinding the negative film and recommencing running thereof. This can be especially time consuming if the negative is released from the supply roller following each run therethrough. There is therefore a need for a device which may quickly and easily be rerun to produce multiple images on the photographic paper the image is being printed to.

Another disadvantage encountered in the prior art is that when the end of the photographic paper held on the supply spool is reached, the photographic paper loses tension and quickly feeds past the image being projected from the negative, thus resulting in an incorrectly reproduced image. There is therefore a need for a paper feed system which will generally alleviate this problem.

Therefore, an object of the present invention is to provide an improved panoramic enlarging printer.

Another object of the present invention is to provide a panoramic enlarging printer which can quickly and easily rerun a negative film placed therein to produce multiple images on photographic paper to which the image is being printed.

Another object of the present invention is to provide a panoramic enlarging printer which does not use rolled negatives to produce images for printing to photographic paper.

Another object of the present invention is to provide a panoramic enlarging printer which is of compact size and shape as compared to those prior art devices discussed above.

Another object of the present invention is to provide a panoramic enlarging printer which will reproduce very high quality and high resolution images on photographic paper.

Another object of the present invention is to provide a panoramic enlarging printer which is efficient in use of photographic paper.

Another object of the present invention is to provide a panoramic enlarging printer which will support a negative in generally flat relation for improving images projected therefrom.

Finally, an object of the present invention is to provide a panoramic enlarging printer which is relatively simple to manufacture, durable and space-efficient in construction and is safe and effective in use.

SUMMARY OF THE INVENTION

The present invention provides an apparatus for enlarging and printing panoramic photographs including a light source and a negative shuttle having upper and lower generally parallel plates for securing and enclosing entirely a negative placed therebetween. Interposed between the light source and the negative shuttle is a focusing device which concentrates light emanating from the light source, thus decreasing the exposure time needed to produce a high quality image. The light source, the focusing device and the negative shuttle are operative to project an image from a negative secured in the negative shuttle in a direction opposite from the light source. For magnifying and focusing the image, a lens is provided, the lens supported in an adjustable lens support which allows for adjustment of the distance between the lens and the negative shuttle. The combination of the above elements is operative to project an image towards a piece of photosensitive material for receiving and printing the image.

A supply spool is provided for receiving and supporting a roll of photosensitive material, the material being passed across the projected image to a take-up spool which is adapted to receive the photosensitive material. A device is provided for supporting the photosensitive material such that a part of the photosensitive material is supported in substantially parallel relation with the negative shuttle and is exposed to the image projected through the lens. Also provided are drive devices for running the take-up spool, the support spool and the negative shuttle. The drive devices are operative to run the negative shuttle in a first direction and to run the support spool and take-up spool in a second direction opposite the first direction such that the photosensitive material is run in said second direction opposite said first direction whereby the image may be transposed onto a part of photosensitive material passing in front of the image projected by the above-discussed elements.

The thus described apparatus for enlarging and printing panoramic photographs provide a substantial improvement over devices found in the prior art. The use of the negative shuttle for enclosing a negative allows an image to be projected from the entire negative without encountering the problems found when the negative is held on spools, such as when the end of the negative is reached, the supply spool releases the negative, resulting in curling of the negative or the end of the negative traveling at a different speed than the rest of the negative, which blurs or distorts the image projected therefrom. Also, the focusing device between the light source and the negative shuttle which concentrates light emanating from the light source allows an image to be transposed from the negative to the photosensitive material in a much shorter time than that necessary with those devices found in the prior art. Finally, as the lens is supported in an adjustable lens support, the distance between the lens and negative shuttle may be varied not only to adjust the focus of the image, but also to allow for various degrees of magnification depending on the lens used. The present invention thus provides a substantial improvement over the prior art.

BRIEF DESCRIPTION OF THE DRAWINGS

FIG. 1 is a perspective view of the printer shell of the present invention;

FIG. 2 is a side elevational view of the printer shell;

FIG. 3 is a rear elevational view of the printer shell;

FIG. 7 is an end elevational view of the negative shuttle showing the bottom U-shaped plate and top plate;

FIG. 8 is a front elevational view of the light feed system;

FIG. 9 is a rear elevational view of the printer shell open to show the drive means for the supply and take-up spools and the drive means for the drive roller;

DESCRIPTION OF THE PREFERRED EMBODIMENT

Figure 4:
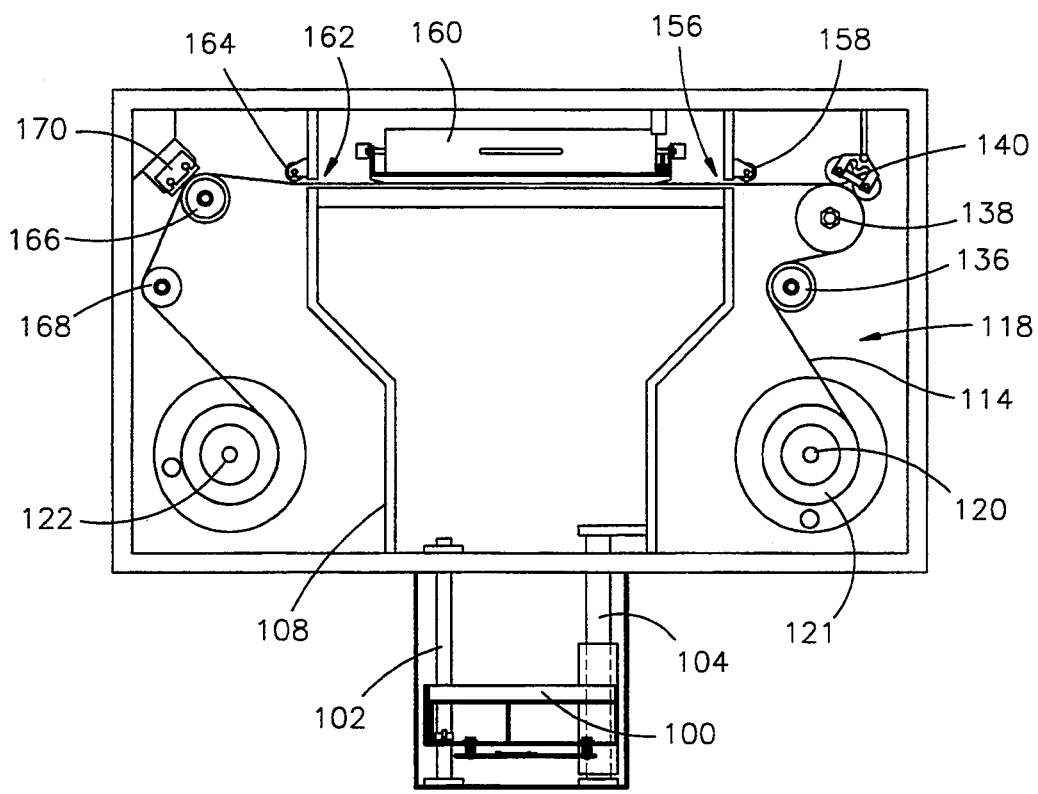
FIG. 4 is a front elevational view of the paper feed system and multi-level deck system including various rollers and paper feed mechanisms.

The panoramic printer 10 of the present invention is shown in its preferred embodiment in FIGS. 1-3 as including a light-tight steel cabinet 12 having front doors 13a and 13b, the cabinet mounted on a desk 14 by cabinet struts 16a and 16b. The panoramic printer 10 preferably includes casters 18a-d to allow the operator to move the printer from a dark room to a daylight operating room. The casters 18a-d are necessary as the panoramic printer 10 weighs approximately 500 lbs., in the preferred embodiment. In the preferred embodiment, the dimensions of the panoramic printer 10 are approximately 47" in width, 26" in depth and 67" in height, though these are not critical. On the right hand side of the panoramic printer 10 are one or more drawers 20a and 20b for storing various printing tools, while the left-hand side of the panoramic printer 10 contains a drawer 22 on the front of which is a control plate 23, the drawer containing the electronic controls for the system.

The desk 14 includes a desk top 24 on top of which is mounted the negative shuttle assembly 26 and below which is mounted the lamphouse assembly 28. It is preferred that the lamphouse assembly 28 be a slightly modified Kodak 26000 variable color lamphouse 30. Such a lamphouse 30 includes a lamp 32 mounted within a parabolic reflector 34 as shown in FIG. 8. It is preferred that the lamp 30 be at least an 800 watt lamp to provide sufficient illumination to transfer an image from a negative to the photographic paper, and for increasing the speed of transposition, even more powerful lamps (up to 2000 watts) may be provided. A cold mirror 35 is used to remove unwanted heat generated from the lamp 32. Likewise, a blower fan 36 may be provided to remove heat from the system. Light 38 passes from the reflector 34 through a secondary dark shutter 40, which is used to keep the intensity of light 38 reaching the negative 50 to a minimum until it is needed. Therefore, unwanted light 38 is prevented from reaching the photographic paper. For controlling the color of the exiting light 38, light filters 42a and 42b, 44a and 44b and 46a and 46b are provided. These filters are mounted above the secondary shutter 40 on mechanical slide rails 48 and consists of two cyan light filters 42a and 42b, two magenta light filters 44a and 44b and two yellow filters 46a and 46b. The position of the filters with respect to the light path determine the resulting color that will be used for exposure. The filters are graduated for repeatable color combinations. Due to extensive exposure to light and heat, the dicrotic filters will fade in time and must be replaced. Because of this fact, it should be noted that the graduations will also drift in time and should be recalibrated occasionally. Of course, alternative methods of color correction may be employed, such as computer color correction of the negative 50 or other such methods.

The final part of the lamphouse 30 is the integrator box 49. This light focusing device concentrates the light 38 to an area of approximately 2"×0.5". The integrator 49 is vitally important to the invention, as without the integrator 49, exposures could take up to six times as long.

Light 38 is projected upwards through the desk top 24 into and through the negative shuttle assembly 26. The negative shuttle assembly 26 includes a shuttle base 52, which may be either the desk top 24 itself or a sheet of material laid on top of the desk top 24, and adjustable shuttle rails 54a and 54b provided to guide the negative shuttle 56 as the negative shuttle 56 slides on top of the shuttle base 52. In a preferred embodiment, the negative shuttle 56 is approximately 20" long and 2.5" wide. It is machined to hold a piece of diffusion plate in the bottom 58 and a piece of plate glass 60 on top of that, as shown in FIG. 7. It is preferred that the bottom part 58 of the negative shuttle 56 has a generally U-shaped cross-section to provide support for and completely enclose a negative 50 placed between the bottom part 58 and top plate 60 of the negative shuttle 56. The diffusion plate in the bottom part 58 of the negative shuttle 56 provides for a more even distribution of light 38 for projecting an image from the negative 50.

The negative shuttle 56 further includes nylon runners 62a–c and nylon side bumpers 64a–d. The nylon runners 62a–c keep the shuttle elevated from the shuttle base 52 and provide very low-friction contact points between the negative shuttle 56 and shuttle base 52 for improving the slidability of the negative shuttle 56. The nylon side bumpers 64a–e provide low-friction contact points between the negative shuttle 56 and adjustable shuttle rails 54a and 54b. The combination of the nylon runner 62a–c and nylon side bumpers 64a–d allows the negative shuttle 56 to be slid on top of the shuttle base 52 with a minimum of friction and therefore few problems caused by vibrations from frictional contact between surfaces.

The negative shuttle 56 and shuttle base 52 are black anodized to eliminate reflected light interference. Referring to the adjustable shuttle rails 54a and 54b, these can be adjusted front to back and are used to position the image across the photographic paper when sending up the focus. If these are not set properly, there can be a black line or a white strip down either side of the paper. The adjustment of these shuttle rails 54a and 54b also increased or decreases the friction forces of the negative shuttle 56 on the rails 54a and 54b.

Figure 6:
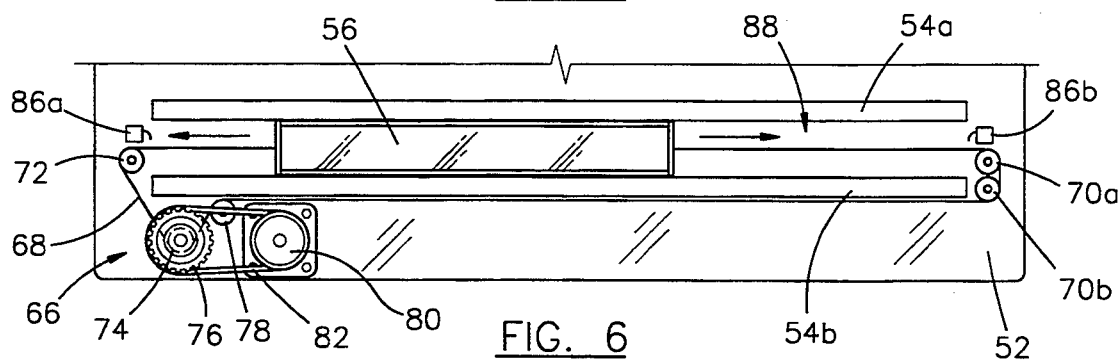
FIG. 6 is a top plan view of the negative shuttle system.

For moving the negative shuttle 56, a pulley system 66 is provided. The pulley system 66 is shown in FIG. 6 as including a cable loop 68 having one end connected to an end of the negative shuttle 56 and the opposite end of the cable loop 68 attached to the opposite end of the negative shuttle 56, as shown in FIG. 6. The cable loop 68 is passed around two pulley blocks 70a and 70b at the right side of the pulley system 66, and around a single pulley block 72 on the left side of the pulley system 66. The cable loop 68 then passes around a drive wheel 74 on top of which is a gear 76. A final pulley block 78 aligns the cable loop 68 with the right side pulley 70b. For driving the drive wheel 74, a reversible stepper motor 80 is provided, the output of the stepper motor 80 connected to the gear 76 by a toothed drive belt 82 which turns the drive wheel 74 without slippage. As shown by the arrows on FIG. 6, the negative shuttle 56 may thus be moved in either a first or second direction, i.e. to the right or left. The toothed drive belt 82 also may pass through a tensioner and then a damper on the return stroke of the drive belt 82, the tensioner and damper supported on a single tensioning damping arm (not shown). The tensioning/dampening arm (not shown) is substantially similar to arm 134 shown in FIG. 9, and is designed to reduce vibrations caused by motion of the drive belt 82.

The negative shuttle assembly 26 preferably also includes a pair of end switches 86a and 86b), one mounted at each end of the negative shuttle track 88. These switches 86a and 86b are used to tell the controller that the negative shuttle 56 is at either end of its cycle. In a preferred embodiment, the negative shuttle 56 cannot be activated unless one of the two switches is engaged. This implies that the shuttle 56 must be at one end or the other end of the shuttle base 52 before it can be started by the controller. The negative shuttle assemble 26 may further include a density control device 90 which is comprised of two coplanar rectangular sheets 92a and 92b, as shown on FIG. 8, which may be moved towards one another or moved apart to add or remove density from the print. The device 90 is only effective for apertures of less than 2" in separation in the preferred embodiment, however, this may vary upon the width of the light beam received from the lamphouse 30.

Finally, the stepping drive motor 80 may be disengaged by depressing the NEG FREE button 94 which disengages the stepper drive 80 and allows the operator to manually move the negative shuttle 56. The shuttle 56 should be moved under these conditions by turning the gear 76 and not by moving the negative shuttle 56 directly, as this can cause damage to the pulley system 66.

As the light 38 passes through the negative shuttle 56 through the density control device 90 and upwards, it encounters the lens 96 which is mounted inside a barrel 98, as shown on FIG. 8. FIG. 4 exhibits the adjustable lens mount 100 in a preferred embodiment as being slidably mounted on parallel runners 102 and 104 such that the lens mount 100 may be moved up or down depending on the desired location of the lens 96. The combination of the adjustable lens mount 100 and barrel 98 allows for coarse and fine adjustment of the lens position above the negative 50. Additionally, various lenses may be used to produce the desired magnification factor for the optical system. To determine the proper magnification for the optical system, one must take into account several variables, including the distance from the negative 50 to the lens center, the focal length of the lens, the magnification factor, the overall distance between the negative 50 and the photographic paper to which the image is being projected and other such variables, however, such calculations are well within the purview of those skilled in the art of enlarging images.

Also shown in FIG. 8 is the primary dark shutter assembly 106 which is located above the lens 96 and is mounted in its own assembly. It has the function of blocking light 38 from reaching the paper when there is no exposure being made. The primary dark shutter 106 is preferably controlled by a solenoid connection to the control plate 23 on the left-hand side drawer 22 of the desk 14. This allows the dark shutter 106 to be opened or closed as determined by the operator.

Figure 5:
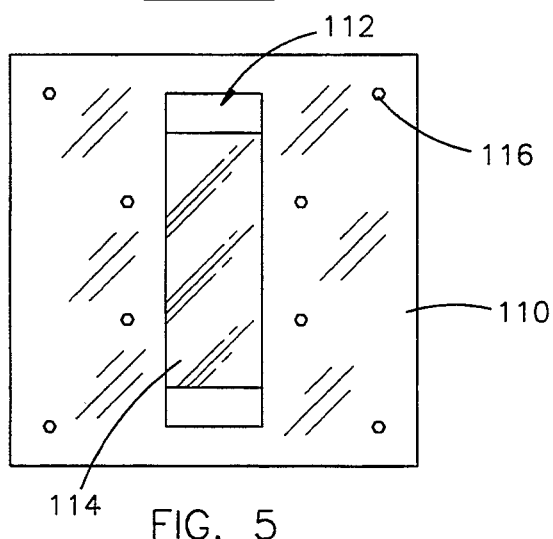
FIG. 5 is a bottom plan view of the slotted plate and the light-admitting slot behind which the paper is exposed to light passing therethrough at the top of the light tunnel.

The image is then projected through a light tunnel 108 upwards toward the top of the light-tight steel cabinet 12 as shown in FIG. 4. The top of the light tunnel 108 is closed off by a slotted plate 110 having a slot 112 formed therein, as shown in FIG. 5. The image is projected through the slots 112 to be transposed onto the photographic paper 114. Various bolts 116 may be used to secure the slotted plate 110 at the top of the light tunnel 108.

The photographic paper feed system 118 includes a supply spool 120 and a take-up spool 122 which pass photographic paper 114 between one another. The photographic paper 114 is preferably between 6" and 11" wide and is mounted on the supply spool 120 in rolled form 121. Long rolls 121 up to 575 feet in length may be supported on the supply spool 120, however, it is preferred that shorter rolls be used as such long rolls can be very heavy and awkward to handle. The supply spool 120 and take-up spool 122 are each propelled by a single drive motor 124, as shown in FIG. 9. Both the supply spool and take-up spool 122 are rotated in a clockwise manner, referring to FIG. 4, and each of the spools is provided with a tensioning clutch which tensions the photographic paper 114 to provide a flat surface for projecting an image thereto. As shown in FIG. 9, the supply spool 120 and take-up spool 122 are connected to the drive wheel 126 of the drive motor 124 by a chain 128, the chain 128 looping around sprockets 130 and 132, connected respectively to the supply spool 120 and take-up spool 122. For reducing vibration which is caused by motion of the chain 128, a tensioning-damping arm 134 is provided, as shown in FIG. 9.

Referring to FIG. 4, photographic paper 114 is removed from the roll 121 on the supply spool 120 and passed around a first directional roller 136 and then around a drive roller 138 which is contacted by a pressure roller 140. It is the drive roller 138 which provides speed control for the paper feed. As shown in FIG. 9, the drive roller 138 is mounted on a toothed gear 142 around which extends a toothed belt 144, the toothed belt 144 extending to a stepper drive motor 146 which controls the rotation speed of the drive roller 138. A motor drive input 148 is connected via wires 150 and contacts 152 to the stepper drive motor 146 for controlling the speed of the stepper motor 146. Control of the motor drive input 148 is achieved by rotation of a drive roller dial indicator 154 mounted on the control plate 23 of the left-hand side drawer 22 of the desk 14. It is preferred that the drive motor 124 for the supply spool 120 and take-up spool 122 provide continuous rotation for the supply spool 120 and take-up spool 122, thus allowing the tension clutches on the supply roller 120 and take-up spool 122 to slip until paper is fed via the drive roller 138. In this manner, constant tension is kept on the photographic paper 114, thus resulting in a superior image being transposed to the photographic paper 114. The pressure roller 140 may be released for manual feeding of paper 114 around the drive roller 138.

The photographic paper 114 then passes through a slotted opening 156 in the light tunnel 108 after passing underneath a slot directional roller 158. The photographic paper 114 then passes underneath a vacuum-backed platen 160 which provides further tension on the photographic paper 114 to provide a substantially flat surface for receiving the image projected from the negative 50. It is to be understood that the paper 114 must be made to assume as flat a surface as possible, and that if this may be accomplished by the roller system alone without use of the vacuum-backed platen 160, the platen 160 may not be needed. It is preferred that slot 112 be approximately 5" wide to provide a sufficient exposure period for the photographic paper 114 without allowing excess light to pre- or post-expose the photographic paper 114. However, the width of slot 112 may be adjusted depending on the desired exposure time.

After the photographic paper 114 is exposed, the paper 114 exits the light tunnel 108 through a second slotted opening 162 passing underneath a second slot directional roller 164 and around second and third directional rollers 166 and 168. A mechanical tensioning device 170 may be provided to increase frictional contact between the second directional roller 166 and photographic paper 114 for increasing tension thereon. The photographic paper 114 is then taken up onto the take-up spool 122. It is preferred that the take-up clutch be adjusted so that when the pressure roller 140 is released and the drive roller 138 is allowed to turn freely, the photographic paper 114 will be pulled through the machine to the take-up spool 122. Therefore, the take-up spool pulls the paper through the system while the drive roller 138 and stepper drive motor 146 control the rate and accuracy of the paper advance.

Figure 10:
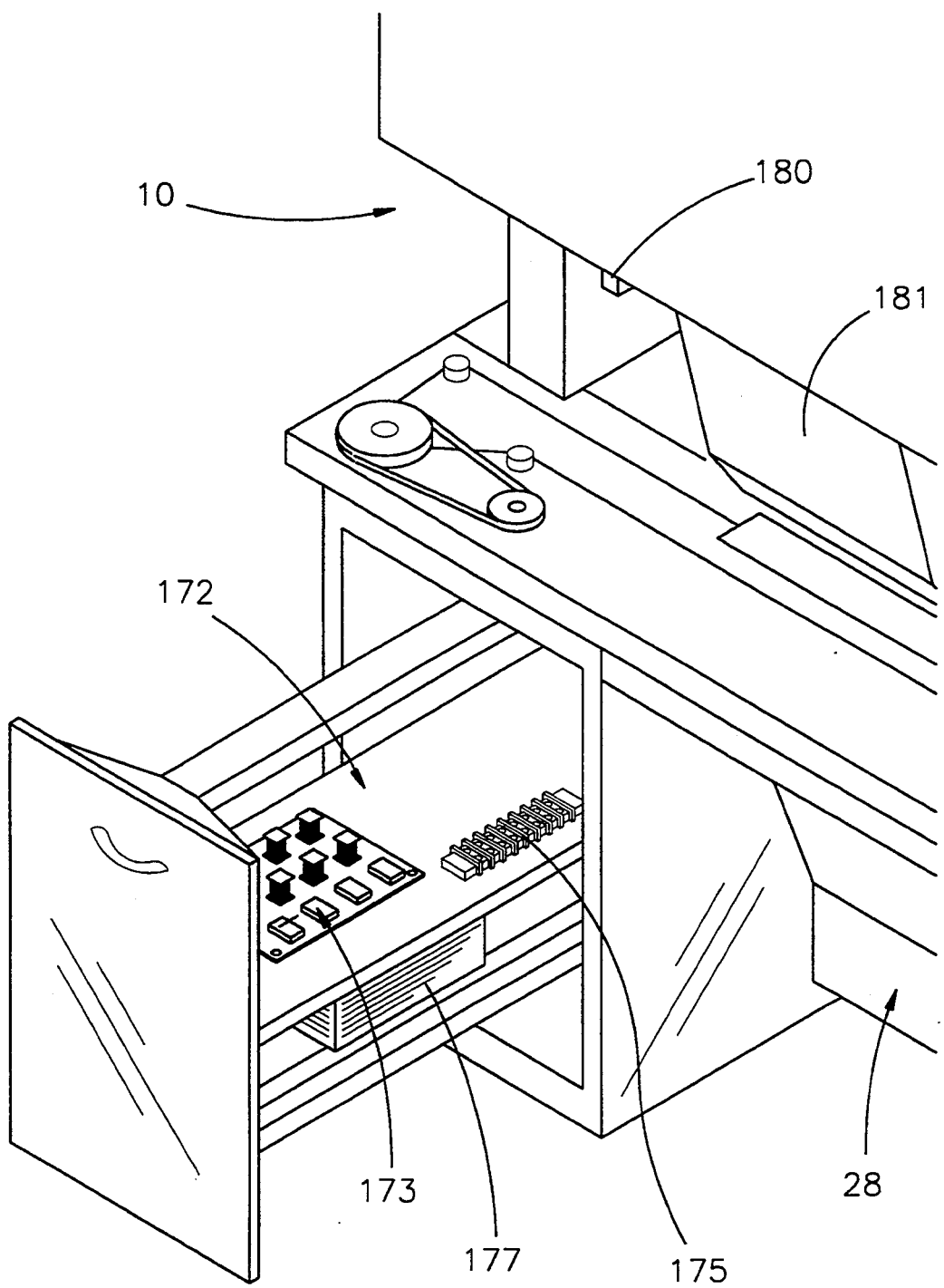
FIG. 10 is a partial perspective view of the left-hand drawer of the invention for the drawer pulled open to expose the circuit board therein.

FIG. 10 exhibits the printer controller assembly 172 of the present invention. The interior of the drawer 22 includes a circuit board 173, which controls the various mechanisms of the printer 10. One of ordinary skill in the art would understand how such a circuit board would be constructed, the connections being shown in the electrical flow diagram of FIG. 11. Also included in the drawer 22 are contacts 175 for distributing the signals from the circuit board 173 to the printer mechanisms and a negative shuttle motor drive input 177 which provides speed control for the negative shuttle stepper motor 80. Negative shuttle motor drive input 177 and motor drive input 148 both operate in a similar manner, and in one embodiment may be a commercially available motor drive input such as a Slo-Syn 430-PT Translator Motor Drive Input. All of the output functions of the printer 10 are controlled by processing state information received from various inputs on the printer 10. In a preferred embodiment, the control plate 23 has four switches mounted on its face and two dial indicators. The START switch 174 engages the negative shuttle stepper motor 80 and paper drive stepper motor 146 if end switch 86a is also depressed. This state remains in effect until end switch 86b is depressed. The REVERSE switch 176 engages the negative shuttle stepper motor 80 if end switch 86b is engaged, reversing the stepper motor 80 and returning the negative shuttle 56 to a start position adjacent end switch 86a. The REPEAT button 178 is an on/off switch which, when on, will set the printer 10 into a print repeating cycle, cycling between the start mode and reverse mode described above. The NEG FREE switch 94 was previously described, and the DRIVE FREE switch 180 operates as does the NEG FREE switch 94, but pertaining to the stepper drive motor 146. The DRIVE FREE switch is preferably located adjacent the lens box 181 on the steel cabinet 12. It is to be understood that many variations are possible concerning the number, functions and positions of the various buttons, and that the arrangement described above is not critical to the invention.

Figure 11:
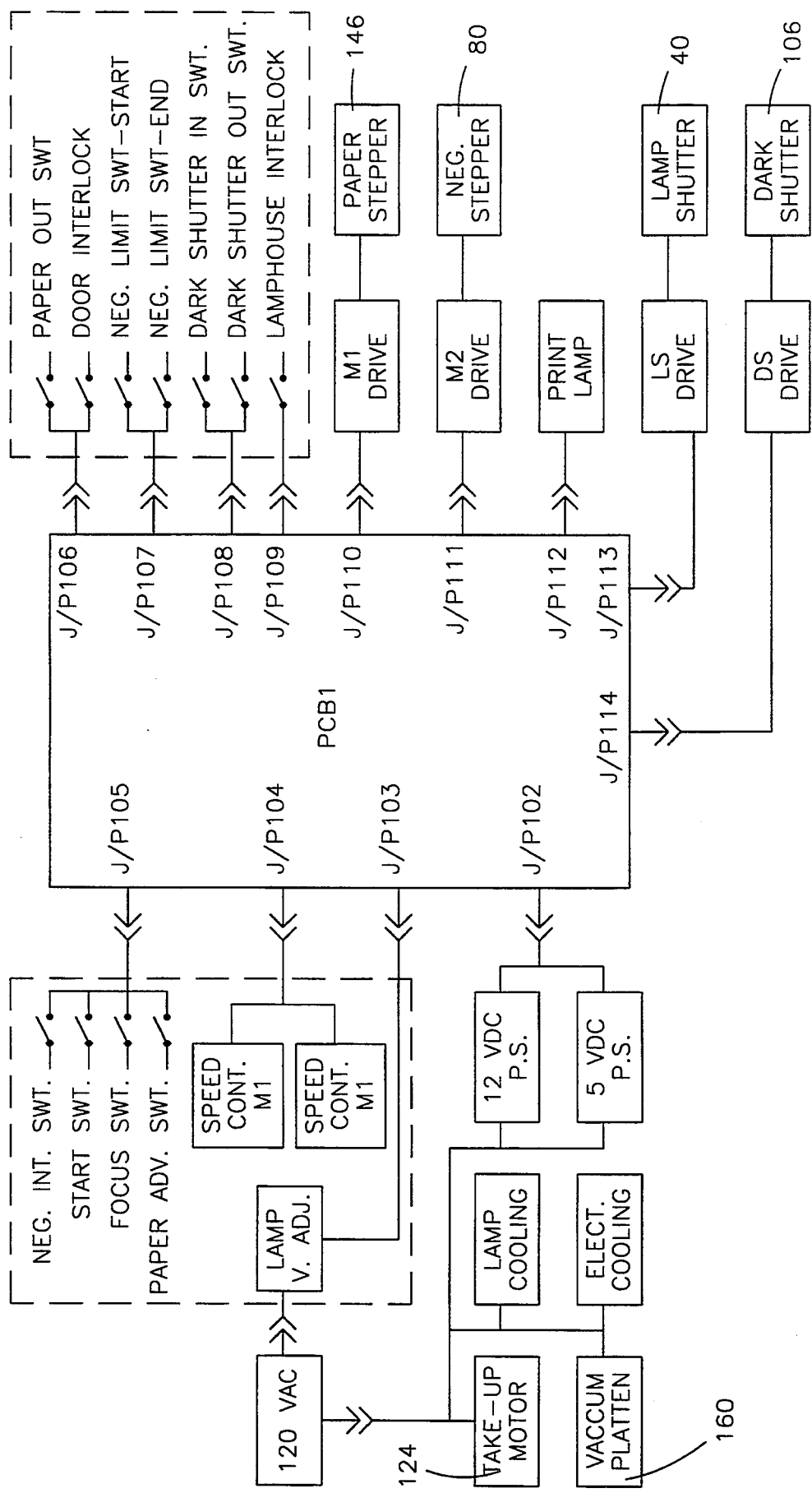
FIG. 11 is an electrical flow diagram exhibiting the various connections between elements of the panoramic enlarging printer.

The preferred electrical connections for the panoramic printer 10 are shown in FIG. 11, however, it is to be understood that the various electrical connections used in the present invention would be well known to those skilled in the art. For example, it is clear that the various electrical devices used in the panoramic printer 10, such as the lamp 32, blower fan 36, secondary dark shutter 40 and primary dark shutter 106 would include power inputs as shown on FIG. 11 with various switches for interrupting these connections. Further explanation is therefore unnecessary as such connections are well-known in the prior art.

Figure 12:
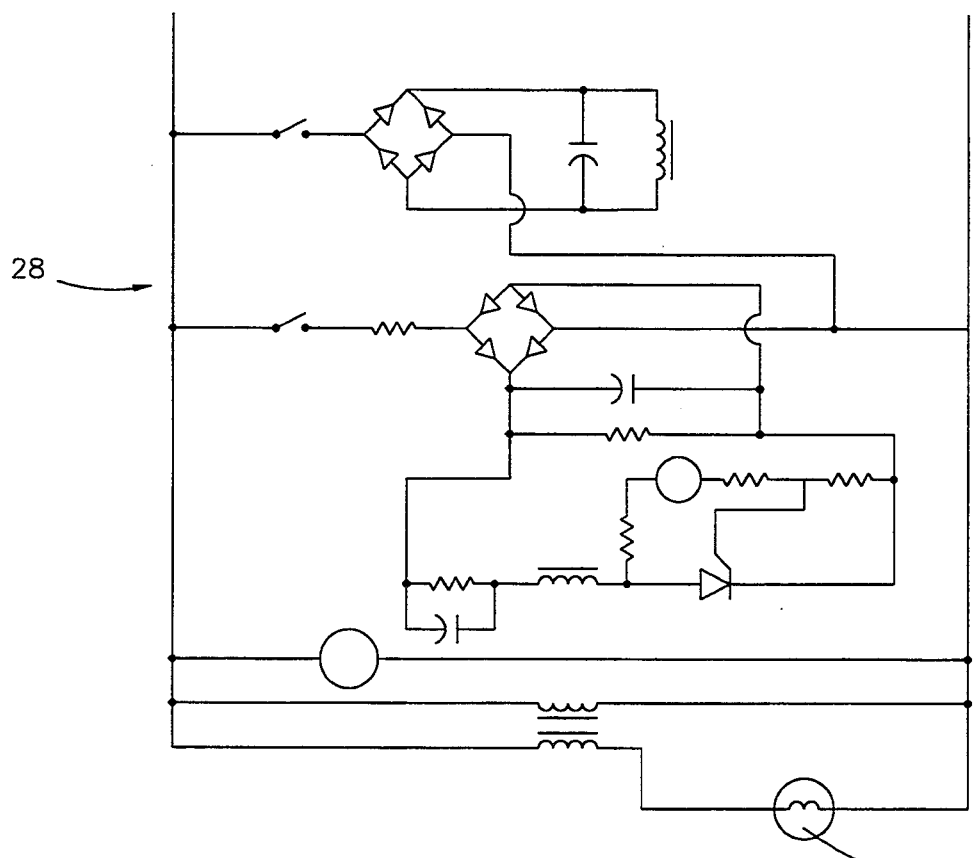
FIG. 12 is an electrical schematic diagram of the light source electrical system.

FIG. 12 exhibits the preferred circuit diagram for a Kodak lamphouse assembly, and is included exclusively for informational purposes. It is to be understood that any similar lamphouse assembly may be used, although the example shown is of Kodak manufacture.

Figure 13:
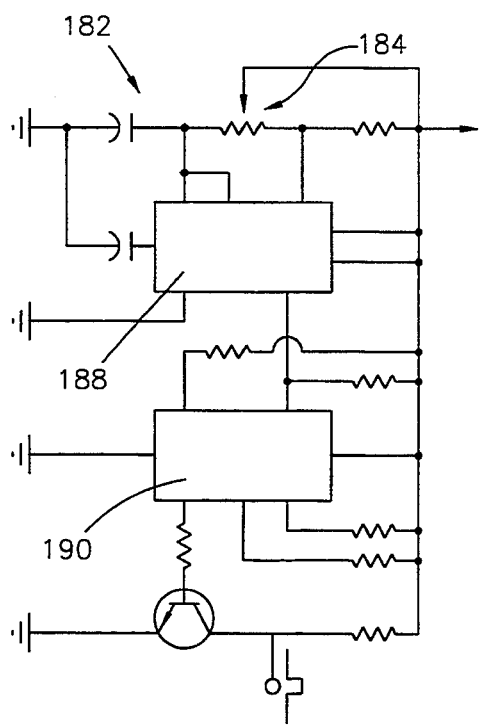
FIG. 13 is an electrical schematic diagram of the clock circuit which determines paper feed speed.

FIG. 13 exhibits one clock circuit 182 of the present invention. The example shown is the clock circuit 182 for the negative shuttle stepper motor 80, and is a fairly standard clock circuit. The only variation from a standard clock circuit is found at the adjustable resistor 184 which is connected to the negative shuttle disk controller 186 to allow for variation in the clock speed output from the clock circuit 182. Chips 188 and 190 are preferably a LM555N microchip and a SN 7473N microchip, respectively. The LM555N chip is a standard clock pulse chip, and the SN 7473N chip is a standard dual J-K flip-flop chip. Similar clock circuits are used to provide input to the drive roller stepper motor 146 and to reverse the negative shuttle stepper motor 80. However, such clock circuits are well-known in the prior art and would clearly be understood by those skilled in the art.

Figure 14:
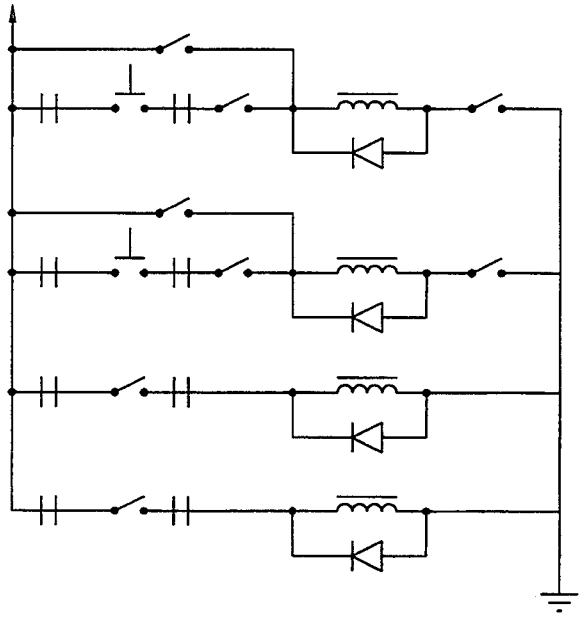
FIG. 14 is an electrical schematic diagram exhibiting various relays and switches in one embodiment of the invention.

Finally, FIG. 14 exhibits the standard relay connection for the various switches disclosed in the present invention. However, many variations of this circuit may be devised, and would clearly be understood by those skilled in the art. Therefore, it is believed that no further explanation is necessary concerning the various circuit diagrams disclosed herein.

It is preferred that the negative shuttle disk controller 186 and drive roller disk controller 154 each be twenty (20) turn graduated dials with a position lock to allow for accurate adjustment of the negative shuttle speed and paper feed speed. To determine the proper relationship between negative shuttle speed and paper feed speed, optical synchronization is preferred. This method of synchronization consist of using a negative having a series of equally spaced lines drawn thereon perpendicular to the direction of travel of the negative shuttle 56 and supplying photographic paper 114 having a plurality of equally spaced lines drawn thereon perpendicular to the direction of advance of the paper 114. As the negative shuttle 56 advances across the integrator 49, the image of the passing lines is projected upwards to the photographic paper 114. The speeds of the negative shuttle 56 and drive roller 138 should be adjusted until the lines projected from the negative 50 are traveling at the same rate of speed-as the lines on the photographic paper 114. The settings on the negative shuttle disk controller 186 and drive roller disk controller 154 should then be recorded to allow for quick and simple resetting of the settings to produce a high quality image on the photographic paper 114. In theory, the speed of the photograph paper 114 should be exactly five times that of the negative shuttle 56 and in the opposite direction. This should produce an image on the photographic paper 114 having dimensions 10"×90" from a negative 50 having dimensions 2"×18". Of course, the speeds may be adjusted to compensate for lighter and darker negatives 50. For example, if the negative 50 is of light exposure, the speed of the negative shuttle 56 must be slower to produce a high quality image for transposition onto the photographic paper 114. Therefore, the photographic paper 114 must also run slower to receive the image properly. Conversely, if the negative 50 is exposed dark, the negative shuttle 56 must be run at a faster speed and likewise the photographic paper 114. In practice, a high-quality, high-resolution photographic print is produced by following the following steps:

1. Coordinate the speeds of the negative shuttle 56 and photographic paper 114 using the optical synchronization techniques as described above.
2. Adjust the exposure colors using the filters 42a and 42b, 44a and 44b, and 46a and 46b.
3. Adjust the density control device 90 to achieve the proper density of light to produce the desired image.

If these three steps are performed correctly, the present invention will produce a photographic exposure of greater quality than any produced by prior art devices, while saving a great quantity of time and effort as has been explained. Following exposure of the paper 114, the paper 114 may be developed using any standard developing means, which are outside of the scope of this invention. The present invention thus provides a substantial improvement over those devices found in the prior art.

It is to be understood that numerous modifications and substitutions may be made to the preferred embodiment of the invention described above. These would include substituting a different brand of lamphouse for producing light necessary to project the image, providing a different clock circuit to properly drive the step or motors, or modifying the locations of the various rollers in the paper feed system. All of these modifications, however, are intended to be within the broad scope of the claims, which are set forth below.

There has thus been shown and described an invention which accomplishes at least all of the stated objectives.

We claim:

1. An apparatus for enlarging and printing panoramic photographs comprising;

a light source;

a negative shuttle having a generally translucent bottom plate for mounting and securing a negative placed thereon, said plate being of a size and shape to mount substantially the entire length of a negative thereon;

focus means interposed between said light source and said negative shuttle for concentrating light emanating from said light source;

said light source, said focus means and said negative shuttle aperture to project an image from a negative secured in said negative shuttle in a direction opposite said light source;

lens means operative to magnify and focus said image;

adjustable lens support means for supporting said lens means at an adjustable distance from said negative shuttle;

supply means adapted to receive and support a quantity of photosensitive material;

take-up means adapted to receive photosensitive material from said supply means;

means for supporting photosensitive material such that a part of photosensitive material is supported in substantially parallel relation to said negative shuttle and is exposed to said image projected through said lens means;

at least one drive means for running said take-up means, said support means and said negative shuttle; and said drive means operative to run said negative shuttle in a first direction and run said take-up means in a second direction opposite said first direction such that photosensitive material is run in said second direction whereby said image may be transposed onto a part of photosensitive material.

2. The apparatus of claim 1 wherein said light source comprises a lamp mounted within a parabolic reflector for directing light in a beam outwards from said light source.

3. The apparatus of claim 2 wherein said light source further comprises secondary shutter means for limiting light output and a set of colored filters for determining the resultant color of light to be used for exposure.

4. The apparatus of claim 3 wherein said colored filters are graduated for repeated color combinations.

5. The apparatus of claim 2 wherein said focus means comprises an integrator for concentrating light output from said light source.

6. The apparatus of claim 1 further comprising a negative shuttle assembly including a shuttle base, adjustable shuttle rails and a density control aperture, said shuttle base adapted to slidably support said negative shuttle, said adjustable shuttle rails adapted to slidably guide said negative shuttle, said adjustable shuttle rails mounted on said shuttle base.

7. The apparatus of claim 6 wherein said density control aperture comprises a pair of coplanar rectangular plates in spaced apart relation, the space between said plates aligned with said light source and said lens means, said space being width adjustable to vary light intensity passing therethrough, said density control aperture mounted between said negative shuttle and said lens means.

8. The apparatus of claim 1 wherein said lens means comprises a focusing and magnifying lens for enlarging said image projected from a negative secured in said negative shuttle.

9. The apparatus of claim 8 wherein said adjustable lens support means comprises a multi-level deck system having a lens mount for removably securing said lens therein, said lens mount movable for alignment with any deck of said deck system for adjusting distance between said lens and said negative shuttle.

10. The apparatus of claim 9 wherein said lens mount comprises a lens barrel for supporting said lens such that the position of said lens relative to said negative shuttle may be more finely adjusted.

11. The apparatus of claim 9 wherein said adjustable lens support means further comprises primary shutter means for substantially completely blocking light output from said light source to photographic paper.

12. The apparatus of claim 1 wherein said supply means comprises a rotating spool having a clutch mechanism for tensioning photosensitive material held thereon relative to said take-up means.

13. The apparatus of claim 12 wherein said take-up means comprises a rotating spool having a clutch mechanism for tensioning and receiving photosensitive material from said supply means, said clutch mechanism on said take-up means having a lower slip differential than said clutch mechanism on said supply means such that said take-up means may draw photosensitive material from said supply means while photosensitive material is continuously tensioned.

14. The apparatus of claim 13 further comprising a drive roller and drive means interposed between said supply means and said take-up means and contacting photosensitive material such that the speed of advance of photosensitive material from said supply means to said take-up means is controlled by said drive roller.

15. The apparatus of claim 1 wherein said means for supporting photosensitive material comprises a vacuum-backed platen for forcing photosensitive material to assume a generally flat surface shape whereby improved printing results may be obtained.

16. The apparatus of claim 6 wherein said drive means for running said take-up means and said supply means comprises an electric motor operatively connected to each of said take-up means and said supply means for providing continuous rotation of said supply and take-up means when said drive means is engaged, thereby providing tension for photosensitive material supported on said supply and take-up means.

17. The apparatus of claim 16 wherein said drive means for running said negative shuttle comprises a stepper drive and pulley system, said stepper drive adjustable for controlling the rate of advance of said negative shuttle, said pulley system comprising a pulley wire attached to said negative shuttle and a plurality of pulley blocks mounted on said shuttle base such that said negative shuttle may be moved between said adjustable shuttle rails in a substantially smooth manner to eliminate vibration.

18. The apparatus of claim 17 wherein said drive means further comprises switch means for stopping advance of said negative shuttle, said switch means operative to detect motion of said negative shuttle and signal said stepper drive to disengage upon said negative shuttle reaching a predetermined stopping point.

19. The apparatus of claim 17 wherein the speeds of said drive means for said negative shuttle and said drive means for said take-up and supply means are adjustable such that said negative shuttle may be moved at an adjusted speed to produce an image of high resolution, and photosensitive material may be run at an adjusted speed to produce a photographic print of high quality and resolution.

20. The apparatus of claim 14 wherein said negative shuttle is run at a first speed and said drive roller is run at a second speed, said second speed from two (2) to eight (8) times faster than said first speed whereby said image projected from said negative shuttle produces an enlarged print on photosensitive material supported on said support means.

21. The apparatus of claim 19 wherein photosensitive material comprises photographic paper for producing a print thereon.

22. The apparatus of claim 1 wherein said negative shuttle further comprises upper and lower generally parallel plates for securing and enclosing entirely a negative placed therebetween.

23. An apparatus for enlarging and printing panoramic photographs comprising;
a light source;
a negative shuttle having upper and lower generally parallel plates for securing and enclosing entirely a negative placed therebetween, wherein said lower plate is generally translucent;
focus means interposed between said light source and said negative shuttle for concentrating light emanating from said light source;
said light source, said focus means and said negative shuttle operative to project an image from a negative secured in said negative shuttle in a direction opposite said light source;
lens means operative to magnify and focus said image;

adjustable lens support means for supporting said lens means at an adjustable distance from said negative shuttle;

a supply spool adapted to receive and support a roll of photosensitive material;

a take-up spool adapted to receive photosensitive material from said supply spool;

means for supporting photosensitive material such that a part of photosensitive material is supported in substantially parallel relation to said negative shuttle and is exposed to said image projected through said lens means;

at least one drive means for running said take-up spool, said support spool and said negative shuttle;

said drive means operative to run said negative shuttle in a first direction and run said take-up spool in a second direction opposite said first direction such that photosensitive material is run in said second direction whereby said image may be transposed onto a part of photosensitive material; and a negative shuttle assembly including a shuttle base, adjustable shuttle rails and a density control aperture, said shuttle base adapted to slidably support said negative shuttle in a plane substantially perpendicular to a line extending between said light source and said lens means such that light emitted by said light source may strike said negative shuttle at a substantially perpendicular alignment, said adjustable shuttle rails mounted on said shuttle base and adapted to slidably guide said negative shuttle and said density control aperture comprising a pair of coplanar rectangular plates in spaced apart relation, the space between said plates aligned with said light source and said lens means, said space being width adjustable to vary light intensity passing therethrough, said density control aperture mounted between said negative shuttle and said lens means.

* * * * *